Nov. 11, 1941.  F. WÖLFER  2,262,716
METHOD AND APPARATUS FOR PRODUCING CABLE SHEATHS
Filed Nov. 30, 1937
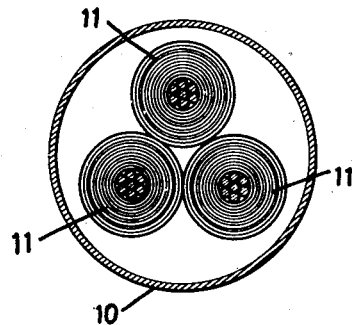
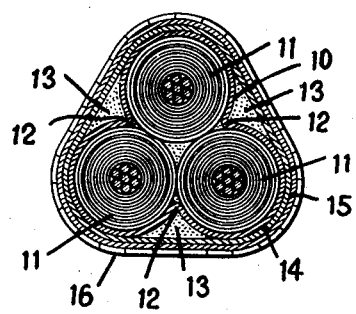
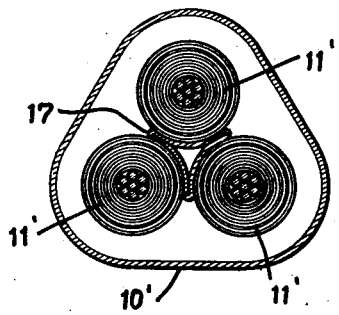
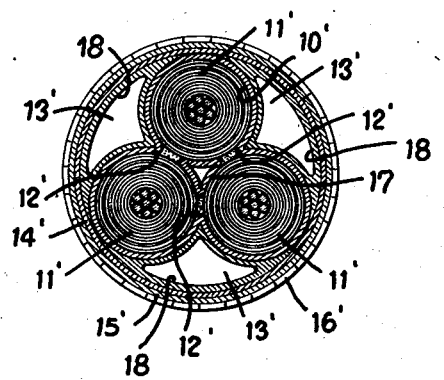
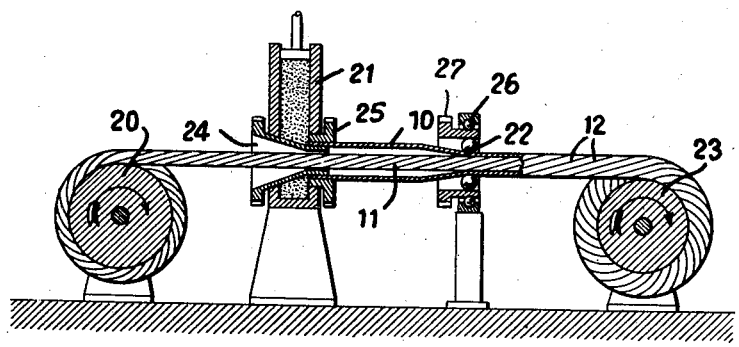
INVENTOR
Franz Wölfer,
BY
ATTORNEY Patented Nov. 11, 1941

2,262,716

UNITED STATES PATENT OFFICE 2,262,716

METHOD AND APPARATUS FOR PRODUCING CABLE SHEATHS

Franz Wölfer, Cologne-Stammheim, Germany, assignor to General Cable Corporation, New York, N. Y., a corporation of New Jersey Application November 30, 1937, Serial No. 177,370
In Germany December 2, 1936

15 Claims. (Cl. 29—33)

This invention relates to method and apparatus for producing metallic sheathed cables, and to the cables produced thereby, and has for an object the provision of improvements in the art.

Electric cables are often formed with a water-resistant sheath of lead, which is extruded over the insulated conductors. It has been proposed to replace the lead with other materials, for example, with aluminum. However, because the melting temperature of aluminum is considerably higher than that of lead, it is not practicable to apply the aluminum sheath in the same manner that a lead sheath is commonly applied, by initially placing the sheath tightly upon the cable.

Various methods have been proposed for placing a water-resistant aluminum sheath upon cables. For example, it has been proposed to form an aluminum tape into a tube, and to weld the tape along its edges. Aside from the fact that this method of forming a sheath involves an undesirable welding seam extending throughout the length of the cable, there are considerable difficulties in forming and welding a tape in this manner.

According to the present invention, a cable sheath of aluminum or of a similar material is first extruded to a size larger than the external circumference of the insulated conductor assembly or cable, and this over-size sheath is then made smaller by folding it or bending it in a longitudinal direction upon the surface of the conductor assen bly. This means, of course, that the cable sheath may be extruded as a separate article and the cable subsequently drawn into the sheath. However, it is especially advantageous to extrude the sheath while the insulated cable is passing through the press, using a special mandrel to initially obtain a sheath having a greater circumference than the cable and then to fold or bend the sheath to fit the cable while the sheath is still warm. In the case of multi-conductor cables, the pleats or folds formed in the sheath can be placed in the valleys between the several insulated conductors comprising the cable. It is also advantageous to form the cable sheath with such a circumference that, after it is taken in, it will contact as much as possible of the outer circumference of the insulated conductors, thus producing in the sheath a star shaped outline corresponding to the cross section of the cable.

The cable sheath may initially be extruded either to form a circular cross section and then given a star shape by folding or pleating; or alternatively, the sheath may be initially extruded into a polygonal shape with rounded corners corresponding in number to the number of conductors in the cable, and then given a star shape to fit the cable. For example, with a three-conductor cable the sheath by the latter method may be given a triangular shape with rounded corners.

It is advisable in forming the sheath to employ a press having a mandrel which at the point of extrusion has a circumference greater than the outer circumference of the insulated cable. The mandrel will also have an interior opening for the passage of the cable. The mandrel and the co-operating die may, if necessary, be mounted so as to revolve around the cable. In order to protect the insulated cable from excessive heat during the extrusion of the sheath some protective arrangement may be employed. For example, a cooling device or some hollow device which is a poor conductor of heat may be provided between the mandrel and the cable; or the mandrel itself may consist of a material which is a poor conductor of heat, or may be provided with cooling means.

For the folding or bending in of the cable sheath a pulley and rolling apparatus may be used. The rolling apparatus is so disposed as to permit easy rotation so that any lack of uniformity in the lay of the conductors in the cable may be easily accommodated without damage. When producing a sheath for a multi-conductor cable, the pulleys and rolling apparatus may be rotated around the cable in accordance with the lay of the conductors, or alternatively the cable itself may be rotated.

The cable fabricated according to the present invention is armored in such a manner that the folds or pleats of the sheath cannot bend up or spread when stress is exerted on the inside of the cable. Furthermore, the folds or pleats in the sheath are filled with spacers or some material which is a good conductor of heat.

A few exemplary forms of cables to which a sheath is applied in accordance with the present invention, and an exemplary form of apparatus for applying the sheath are illustrated in the accompanying drawing wherein:

Fig. 1 is a cross section of a three-conductor cable with a circular sheath of initially extruded size surrounding it;

Fig. 2 is a cross section of the same cable after the sheath has been deformed to fit about the conductors and after other elements have been added to the cable;

Fig. 3 is a cross section of a three-conductor cable of a slightly different form from that shown in Fig. 1, with an initially extruded sheath thereon having a generally triangular shape with rounded corners;

Fig. 4 shows the cable of Fig. 3 after the sheath has been deformed and other elements added to the cable; and Fig. 5 illustrates in somewhat diagrammatic form exemplary apparatus suitable for applying the sheath to a cable.

Referring to Fig. 1 the cable sheath 10, which may be formed from aluminum, is, initially after extrusion, of circular shape and of considerably greater diameter than that of the cable formed of the insulated conductors 11.

As shown in Fig. 2 the cable sheath 10 is then reduced by folding or bending as at 12 so that it closely embraces the outer circumference of the insulated conductors 11, giving the sheath a sort of star shape, depending upon the cross section of the assembly of insulated conductors.

Exteriorly of the cable sheath there are formed valleys 13 which may be filled with the material which is a good conductor of heat. The outer circumference of the cable is now somewhat triangular in cross section.

Over the cable sheath and the valley-filling material there may be placed a corrosion resistant covering 14 constituted, for example, of asphalt treated paper. Over this may be placed a steel tape jacket 15 and over this a steel strip covering 16.

Figs. 3 and 4 illustrate a modification of the construction shown in Figs. 1 and 2. In the latter form the insulated conductors 11' are cabled around an insert or core 17. The cable sheath 10' is initially extruded in a generally triangular shape with the corners rounded off, the shape, as before, having a circumference greater than that of the cable outline formed by the several conductors. As shown in Fig. 4, the cable sheath has been reshaped by longitudinal folding or creasing at 12' into a sort of star shape similar to that shown in Fig. 2. The valleys 13' exteriorly of the sheath between conductors are filled with suitable material such as a tubular member 18 of elastic or resilient material. As shown, the valley-filling members are of such shape as to give the completed cable a circular cross section. Over the above assembly there is placed a corrosion-resistant covering 14' which, in turn, is surrounded by a layer 15' of corrosion-resistant steel tape, and over this an armor 16' of metal strip. The cavities in the members 17 and 18 may be filled with an insulating or pressure agent if desired.

In Fig. 5 there is shown apparatus for forming a cable sheath in accordance with the present invention. Here the cable 11 comprising a plurality of insulated conductors is drawn from a supply reel 20 through a press 21 and a pulley and roller device 22 by a take-up reel 23. The press forms the cable sheath 10 as fast as the cable moves. The press is provided with a hollow mandrel 24 which may be rotated. The press is also provided with a rotating die 25 adapted to cooperate with the mandrel to form the extruded cable sheath 10. In the present instance the mandrel and die are of generally triangular shape so as to form a triangular cable sheath with rounded corners such as that shown in Fig. 3. The mandrel is preferably made of material which is a poor conductor of heat. As stated, both the mandrel and the die rotate around the advancing cable. They are rotated at a speed corresponding to the pitch or lay of the conductors in the cable. Instead of rotating the mandrel and die the cable itself may be rotated by rotating the cable reels bodily transversely of their axes. In the former case the pulley and roller device 22 may be rotated about the cable to follow the lay of the conductors therein, and for this purpose the sheath-forming members are set in a frame 27 carried in roller bearings 26. By the apparatus described the cable sheath is deformed to fit it about the conductors in the cable and this also improves its structure. The deforming mechanism reduces the sheath to a general star shape as illustrated in Figs. 2 and 4.

The cable sheath may, of course, be applied not only to multi-conductor cables having circular, oval, or sector shaped conductors, but may also be applied to a cable consisting of a single conductor. It is particularly advantageous in the formation of oil and pressure cables. Instead of forming the seamless sheath by extrusion it may be produced by rolling or drawing operations. This invention provides a sheath about the cable which is seamless, impermeable, and adapted to be formed of a material which is relatively hard to fuse, and in placing the sheath the cable is not injured nor are undesirable vacuums created on the interior of the sheath. In other words a cable produced in accordance with the present invention is superior in heat transfer, which permits a high current capacity and a uniform field distribution.

While certain illustrative embodiments of the invention have been particularly described, it is to be understood that the invention may be variously embodied within the limits of the prior art and the scope of the sub-joined claims.

I claim:

1. The method of continuously forming a cable sheath on a cable of indefinite length which comprises initially forming on the cable a seamless sheath of a size greater than the external size of the cable to be covered, and subsequently reducing the sheath in size while the cable is disposed therein so as to cause it to fit upon the cable.

2. The method of continuously forming a cable sheath on a cable of indefinite length which comprises extruding an over-size sheath on the cable and subsequently reducing the sheath by creasing or folding it longitudinally so as to cause it to fit upon the cable.

3. The method of continuously forming a cable sheath on a cable of indefinite length which comprises forming an over-size seamless sheath upon a multi-conductor cable, and subsequently folding or creasing the sheath in the valleys between the conductors so as to cause the sheath to fit the cable.

4. The method as set forth in claim 3 further characterized by initially forming the sheath into circular shape and then creasing or folding it into a general star shape to fit the cable.

5. The method as set forth in claim 3 further characterized by forming the sheath into polygonal shape with rounded corners corresponding in number to the number of conductors in the cable and subsequently folding or creasing the sheath into a general star shape to fit the cable.

6. Apparatus for continuously placing a seamless sheath on a cable of indefinite length comprising in combination a sheath press for forming the sheath, means for drawing a cable through the press as the sheath is formed, a hollow mandrel surrounding the cable having a size to form the sheath initially larger than the cable, and means for reducing the sheath on the cable.

7. Apparatus for forming and applying a seamless metallic sheath on an insulated cable, comprising in combination, a press for forming the sheath, means for moving the cable through said press, a hollow mandrel for said press larger than said cable, there being provision for relative rotation between said cable and said mandrel.

8. Apparatus for forming and applying a seamless metallic sheath on an insulated cable, comprising in combination, a press for forming the sheath, means for moving the cable through said press, a hollow mandrel and a die provided for said press, said mandrel and die being mounted for rotation about said cable.

9. Apparatus for forming and applying a seamless metallic sheath on an insulated cable, comprising in combination, means for moving the cable longitudinally, means for extruding an over-sized sheath on the cable, and means for reducing the heat reaching said cable from said sheath extruding means.

10. Apparatus for forming and applying a seamless metallic sheath on an insulated cable, comprising in combination, means for advancing a cable having thereon an over-sized sheath, and means for reducing said sheath on said cable as it advances.

11. Apparatus for forming and applying a seamless metallic sheath on an insulated cable, comprising in combination, means for advancing a cable having thereon an over-sized sheath, and means for reducing said sheath on said cable as it advances, said means including a member for forming a longitudinal fold or crease in the sheath.

12. Apparatus for forming and applying a seamless metallic sheath on an insulated cable, comprising in combination, means for advancing a cable having thereon an over-sized sheath, and means for reducing said sheath on said cable as it advances, said means including circumferentially spaced devices adapted to roll longitudinally on the sheath to form folds or creases therein.

13. Apparatus for forming and applying a seamless metallic sheath on an insulated cable, comprising in combination, means for advancing a cable having thereon an over-sized sheath, and means for reducing said sheath on said cable as it advances, said means including circumferentially spaced devices adapted to roll longitudinally on the sheath, and mounting means for said devices rotatable about said cable.

14. Apparatus for applying an over-sized metallic sheath to a cable, comprising in combination, supply and take-up reels for the cable, a device surrounding the cable and sheath for forming longitudinal folds in the sheath, and means to rotate said cable and its supply and take-up reels relative to said device.

15. The method of continuously forming a cable sheath on a cable of indefinite length which comprises forming a hot sheath of a size greater than the external size of the cable core surrounding, but out of contact with, the cable core, permitting the hot sheath to cool at least partially, and then reducing the sheath in size so as to cause it to fit upon the cable core.

FRANZ WÖLFER.